United States Patent
Khamene et al.

(10) Patent No.: US 8,218,909 B2
(45) Date of Patent: Jul. 10, 2012

(54) SYSTEM AND METHOD FOR GEODESIC IMAGE MATCHING USING EDGE POINTS INTERPOLATION

(75) Inventors: Ali Khamene, Princeton, NJ (US); Fabrice Michel, Grabels (FR)

(73) Assignee: Siemens Aktiengesellschaft, München (DE)

( * ) Notice: Subject to any disclaimer, the term of this patent is extended or adjusted under 35 U.S.C. 154(b) by 988 days.

(21) Appl. No.: 12/198,190

(22) Filed: Aug. 26, 2008

(65) Prior Publication Data
US 2009/0067755 A1 Mar. 12, 2009

Related U.S. Application Data

(60) Provisional application No. 60/968,994, filed on Aug. 30, 2007.

(51) Int. Cl.
*G06K 9/32* (2006.01)

(52) U.S. Cl. ........ 382/300; 382/199; 708/290; 708/313; 708/847; 358/525; 348/537; 348/597; 386/271; 345/475

(58) Field of Classification Search .......... None
See application file for complete search history.

(56) References Cited

U.S. PATENT DOCUMENTS

2005/0245810 A1* 11/2005 Khamene et al. ............. 600/410
2007/0116381 A1* 5/2007 Khamene ...................... 382/276
2008/0095465 A1* 4/2008 Mullick et al. ................ 382/284

OTHER PUBLICATIONS

Bookstein, "Principal Warps: Thin-Plate Splines and the Decomposition of Deformations," Jun. 1989, IEEE, vol. 11, pp. 567-585.*

* cited by examiner

*Primary Examiner* — John Lee
(74) *Attorney, Agent, or Firm* — Donald B. Paschburg; F. Chau & Associates, LLC

(57) ABSTRACT

A method for deformable registration of 2 digital images includes providing a pair of digital images, including a fixed image and a moving image, extracting a set of edge images from each image of the pair of images, each edge set being extracted at a different resolution, selecting a pair of edge images with a lowest resolution, determining a mapping from edge points of the fixed image to edge points of moving image using a geodesic thin plate spline interpolation, applying the mapping to a next higher resolution edge point image of the moving image, selecting a pair of edge images at a next higher resolution, where a moving edge image is the moving edge image to which the mapping has been applied, repeating the steps at a next higher resolution for all edge images in the set of edge images, and applying the mapping to an entire moving image.

19 Claims, 10 Drawing Sheets

FIG. 2: Gaussian Pyramid

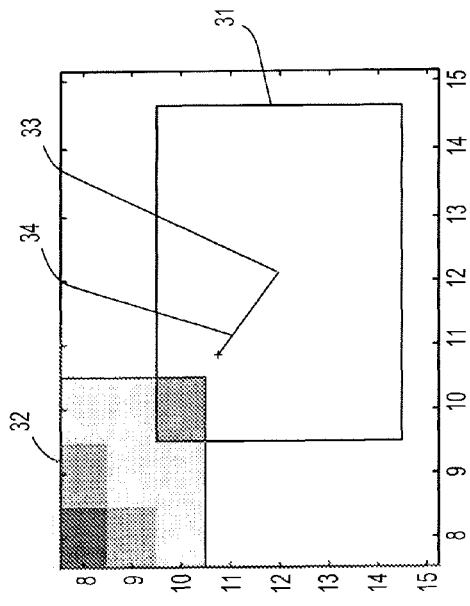
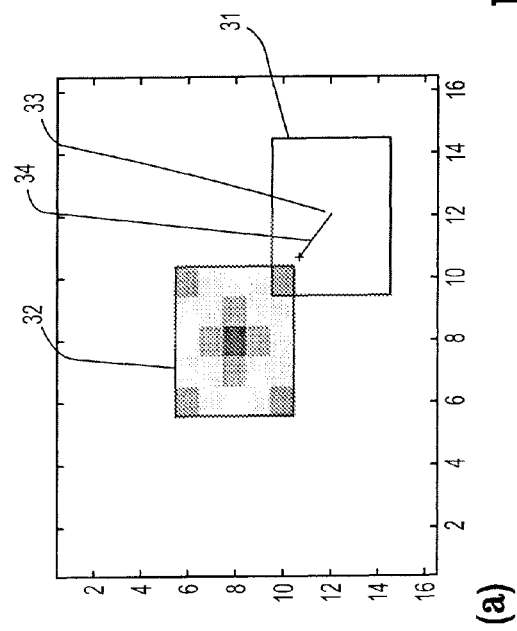
FIG. 3
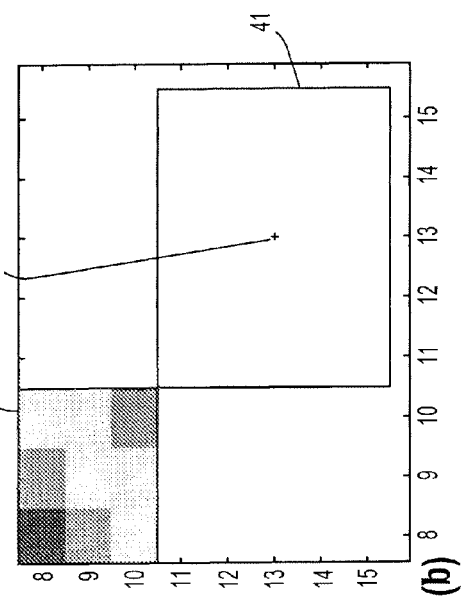
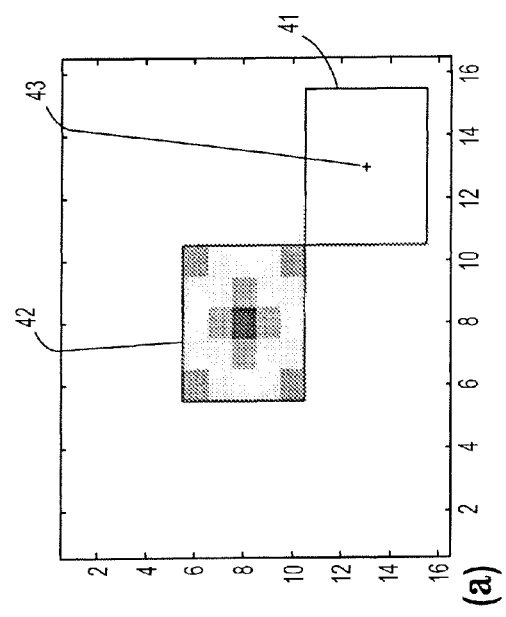
FIG. 4

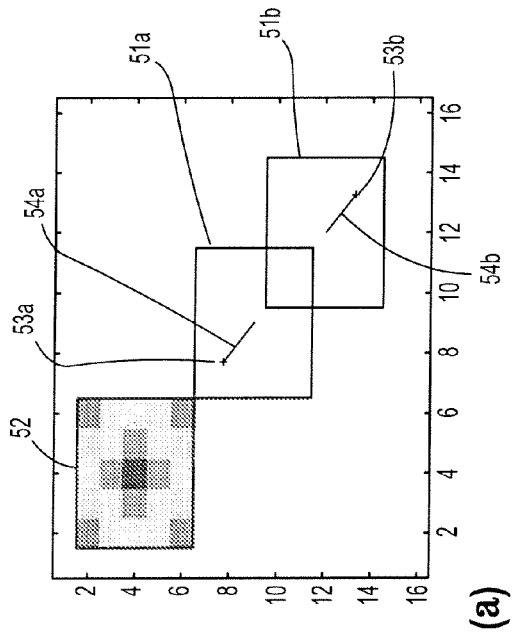
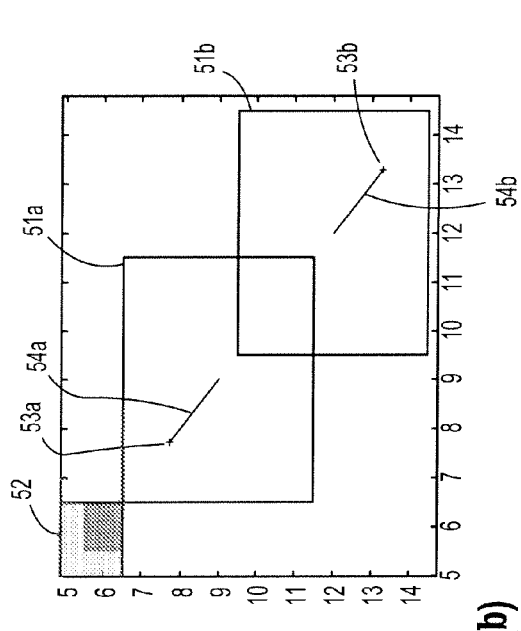
FIG. 5
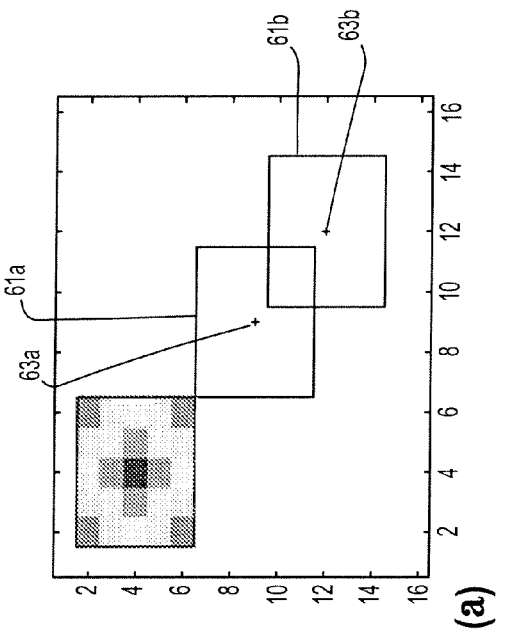
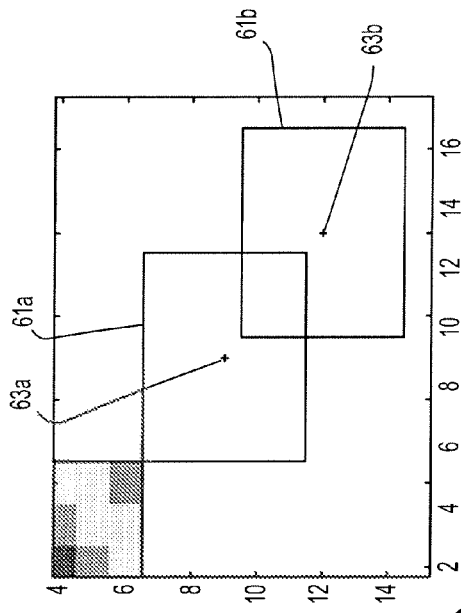
FIG. 6

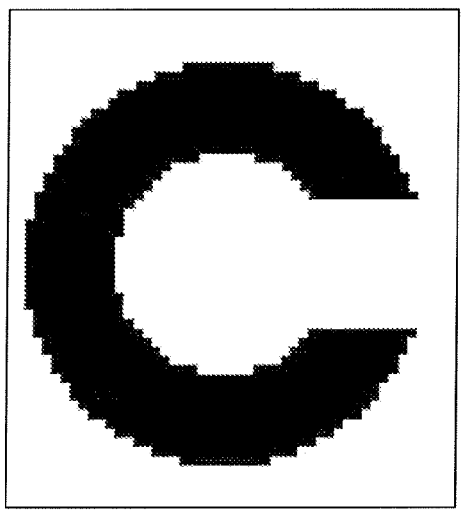 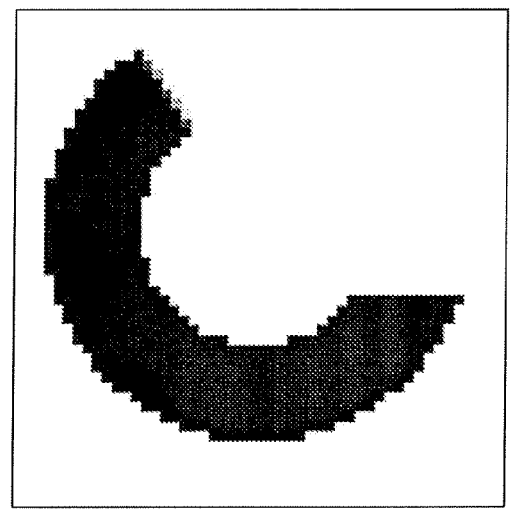
(a) (b)
FIG. 7

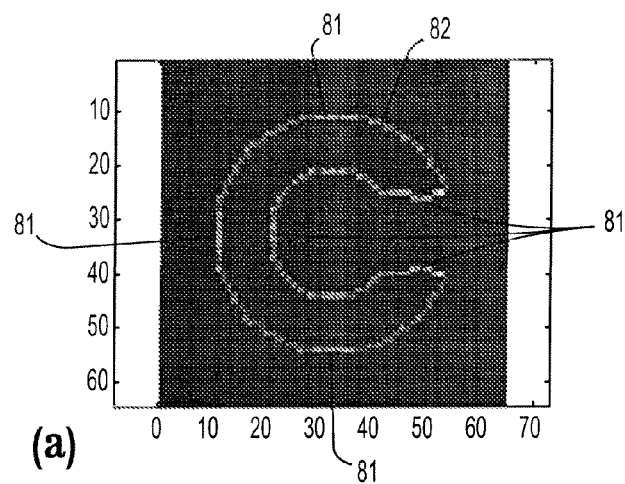
(a)
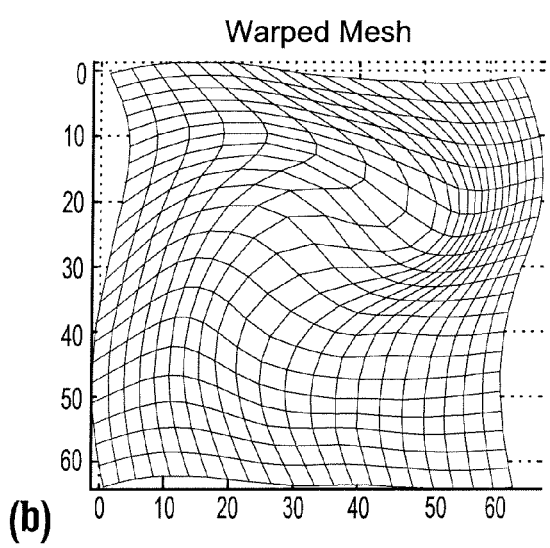
(b)
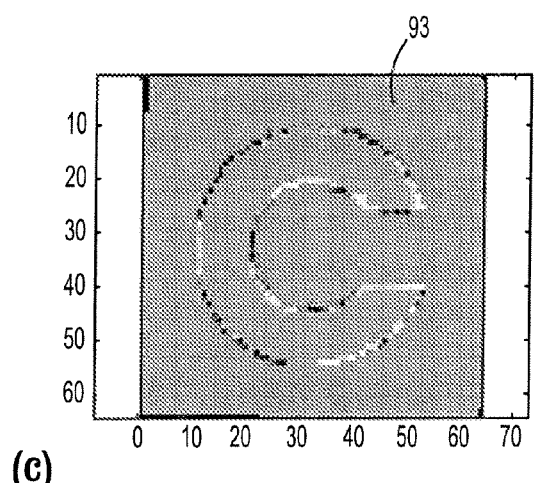
(c)
FIG. 8

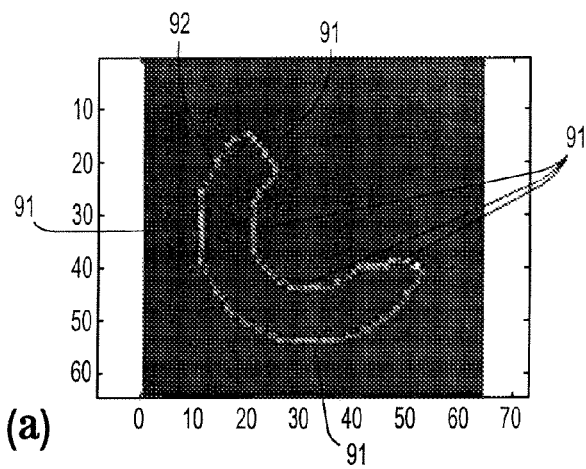
(a)
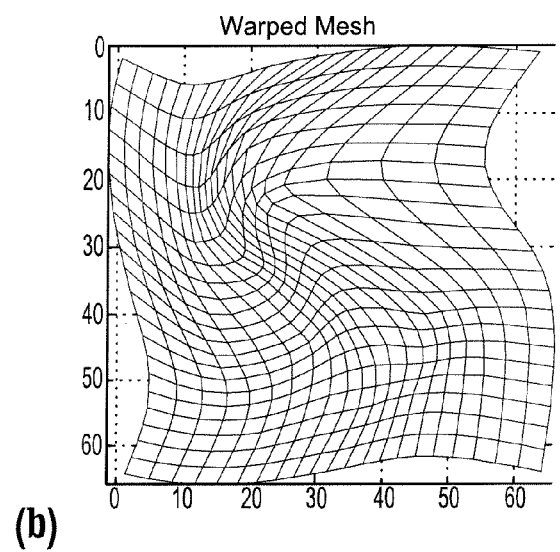
(b)
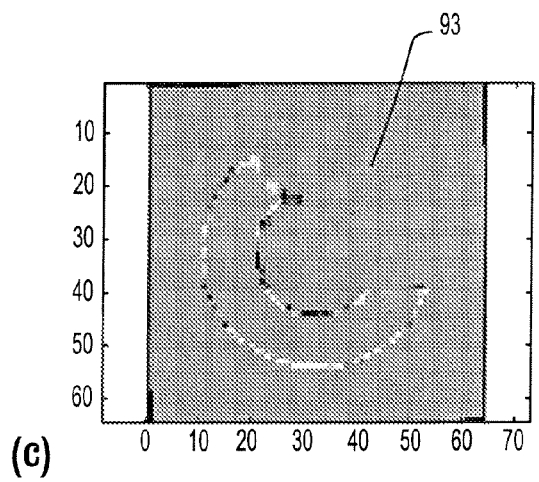
(c)
FIG. 9

SYSTEM AND METHOD FOR GEODESIC IMAGE MATCHING USING EDGE POINTS INTERPOLATION

CROSS REFERENCE TO RELATED UNITED STATES APPLICATIONS

This application claims priority from "Geodesic Image Matching", U.S. Provisional Application No. 60/968,994 of Khamene, et al., filed Aug. 30, 2007, the contents of which are herein incorporated by reference in their entireties.

TECHNICAL FIELD

This disclosure is directed to deformable image registration.

DISCUSSION OF THE RELATED ART

Image registration has been widely explored by numerous approaches. Rigid registration is now something people know well how to do. In essence, rigid registration involves finding the rotations, translations, and image scaling which make one image match another. This means that there are at most 16 parameters to work with. In the case of deformable registration, one wants to match one image with another that has been deformed, not just moved. In medical imaging, the displacement of the lungs is a good example, where one can not match a lung at full inhale with a lung at full exhale only by rotating, translating and scaling of the chest. Here one needs to actually move each pixel of the first image to match a pixel with the other image. This is a tedious task and the number of parameters is typically a multiple of the number of pixels in the image. Thus, there is a much bigger parameter space. One then would like to reduce this space by selecting only some of the pixels to be moved, hoping that the other pixels will follow the movements of the selected pixels. This is the interpolation framework.

SUMMARY OF THE INVENTION

Exemplary embodiments of the invention as described herein generally include methods and systems for a computationally efficient registration method using interpolation, where only some points on the edges are registered. The rest of the displacement is induced by the interpolation. One issue is that the displacement of the few points, the landmarks, can lead to tearing or folding of the image. Thus a one-to-one mapping may be enforced. A deformation according to an embodiment of the invention remains natural for all iterations and not just at the first and final stage.

FIG. 1 is a flowchart of a registration method according to an embodiment of the invention. An input to a registration according to an embodiment of the invention is the two images one wants to register, a moving image, and a fixed image, at steps 10a and 10b. A process according to an embodiment of the invention is a multi-resolution process based on the detection of the edges at different scales of resolution. An exemplary edge detection technique is the Canny edge detection algorithm, applied to the input images at steps 11a and 11b. The output of the edge filtering is n images of edges, for n resolutions. Starting with the lowest resolution edge image, some chosen points are selected from the edges of the fixed and moving images at steps 12a and 12b. At step 13, the two sets of points with unknown correspondences and different cardinals are matched by calculating a deformation mapping. According to an embodiment of the invention, the deformation mapping is calculated using geodesic thin plate splines, driven by a map of intensities built up with the knowledge of the edges and the intensities of the derivatives on the edges. For a first iteration of the multi resolution, the original filtered points are used, then the points warped using the mapping generated during the previous iteration are used for subsequent iterations. If, at step 14, all the iterations have been used, the mapping is applied to the moving image at step 16 to recover the registered image, otherwise the mapping is applied to the next higher resolution moving edge image at step 15. A method according to an embodiment of the invention does not generate the mapping until the end of the process, thus improving computational efficiency.

According to an aspect of the invention, there is provided a method for deformable registration of 2 digital images, the method including providing a pair of digital images, each image comprising a plurality of intensities associated with a 2-dimensional grid of points, said pair including a fixed image and a moving image, extracting a set of edge images from each image of said pair of images, each edge set being extracted at a different resolution, selecting a pair of edge images with a lowest resolution, determining a mapping from edge points of said fixed image to edge points of moving image using a geodesic thin plate spline interpolation, applying said mapping to a next higher resolution edge point image of said moving image, selecting a pair of edge images at a next higher resolution, wherein a moving edge image is the moving edge image to which said mapping has been applied, repeating said steps of determining a mapping, applying said mapping, and selecting a pair of edge images at a next higher resolution for all edge images in said set of edge images, and applying said mapping to an entire moving image.

According to a further aspect of the invention, the method includes reducing a number of points in each of said edge images, prior to determining said mapping.

According to a further aspect of the invention, reducing a number of points comprises following a curve defined by a set of edge points, keeping one point every $\alpha$, wherein $\alpha$ is a predetermined distance interval, and keeping those points wherein an angle made by three points in $\beta$ points is greater than $\theta$, wherein $\beta$ is a predetermined number of points and $\theta$ is a predetermined angle.

According to a further aspect of the invention, the method includes using a Gaussian pyramid to generate images at progressively lower resolutions to extract edge sets at different resolutions.

According to a further aspect of the invention, a geodesic thin plate spline interpolation comprises initializing moving points $q_i$ from fixed points $p_i$, wherein said fixed points are selected from edge points of said fixed image, wherein said moving points and said fixed points have 2-dimensions, initializing a set of N 2-dimensional curbs $\zeta_i(t)$, $i \in [1,N]$, on said image domain parameterized by $t \in [0,T]$ associated with paths from said fixed points $p_i$ to moving points $q_i$ wherein $$\zeta_i(t) = p_i + \frac{t}{T}(q_i - p_i),$$

updating said curbs for parameters $t \in [2,T-1]$ using a gradient descent of an energy associated with paths from said landmark points $p_i$ to landmark points $q_i$, calculating from said curbs for parameters $t \in [2,T-1]$ a set of coefficients a, b, $\alpha$ that define a diffeomorphic function g defined on said image domain wherein $g(p_i) \cong q_i$, $\forall i \in [1,N]$, and $$g(x) = ax + b + \sum_{i=1}^{N} \alpha_i f_{p_i}(x),$$

wherein a is a 2×2 matrix, b is a 2D vector, α is a 2×N matrix, and $f_p(x)$ are a set of basis functions, calculating g from said coefficients, updating said curbs for t=T from said diffeomorphic function g and a gradient descent of said constraint energy calculated for points transformed by g, and repeating said steps of updating said curbs for parameters t∈[2,T−1], calculating said coefficients a, b, α, calculating g, and updating said curbs for t=T until g converges, where g is a deformation field that maps said fixed edge points to said moving edge points, and said curbs for t=T represent the image of the initial points as transformed by g.

According to a further aspect of the invention, the $q_i$ are initialized as $$q_i = p_i - \gamma \frac{\partial C_F}{\partial p_i}(p_i, \ldots, p_N),$$

wherein $$C_F(P^I) = \sum_{x,y} (S^F(x, y) - S^M(x, y))^2$$

is said constraint energy, $S^F$ and $S^M$ are structural intensities for a fixed image and a moving image, respectively, wherein $$S^I = \sum_{i \in P^I} v_i^I K * \delta(P_i^I),$$

where δ represents the Dirac distribution, K represents a Gaussian kernel, points $P^I = \{P_1^I, \ldots, P_i^I, \ldots, P_n^I\}$ are points defining the edges of image I, wherein I is either the moving or the fixed image, $v^I = \{v_1^I, \ldots, v_i^I, \ldots, v_n^I\}$ are their associated values, and γ is a predefined constant.

According to a further aspect of the invention, points in the moving set are constrained to be in a set $$\hat{P} = \left\{ k \in N \mid K * \delta(P_k^M) \cap \bigcup_j (K * \delta(P_j^M)) \neq \{\emptyset\} \right\}.$$

According to a further aspect of the invention, updating said curbs for parameters t∈[2,T−1] using a gradient descent comprises calculating $$\zeta_i(t) \leftarrow \zeta_i(t) - \beta \frac{\partial E}{\partial \zeta_i(t)}$$

wherein $$E(\alpha, \zeta) = \sum_{i,j=1}^{N} \sum_{t=0}^{T} \langle \alpha_i(t), \alpha_j(t) \rangle U(|\zeta_i(t) - \zeta_j(t)|) + \lambda \sum_{i=1}^{N} \sum_{t=0}^{T-1} \|Z_i(t)\|^2,$$

$$U(r) = r \log r,$$

$$Z_i(t) = D_t(\zeta_i) - a(t)\zeta_i(t) - b(t) - \sum_{k=1}^{N} \alpha_k U(|\zeta_k(t) - \zeta_i(t)|),$$

wherein
wherein for any time dependent function u, $D_t(u) = T \times (u(t+1) - u(t))$, t∈[0,T−1], and β is a predefined constant.

According to a further aspect of the invention, calculating said coefficients a, b, α comprises forming a 3×N matrix $$P = \begin{bmatrix} 1 & \zeta_1^x(t-1) & \zeta_1^y(t-1) \\ 1 & \zeta_2^x(t-1) & \zeta_2^y(t-1) \\ \ldots & \ldots & \ldots \\ 1 & \zeta_N^x(t-1) & \zeta_N^y(t-1) \end{bmatrix};$$

forming an N×N matrix K of $U(r_{i,j})$ as $$K = \begin{bmatrix} 0 & U(r_{1,2}) & \ldots & U(r_{1,N}) \\ U(r_{2,1}) & 0 & \ldots & U(r_{2,N}) \\ \ldots & \ldots & \ldots & \ldots \\ U(r_{N,1}) & U(r_{N,2}) & \ldots & 0 \end{bmatrix},$$

and matrix $K_\lambda = K + 1/\lambda K$ wherein λ is a smoothness parameter greater than 0, $r_{i,j} = |P_i - p_j|$ is a distance between the points i and j, and $U(r) = r \log(r)$, forming a 3×3 matrix of zeros O, forming a (N+3)×(N+3) matrix $$L = \begin{bmatrix} K_\lambda & P \\ {}^t P & O \end{bmatrix},$$

calculating $L^{-1}Q$ wherein $$Q = {}^t \begin{pmatrix} \zeta_1^x(t), \ldots, \zeta_N^x(t), 000 \\ \zeta_1^y(t), \ldots, \zeta_N^y(t), 000 \end{pmatrix},$$

wherein ${}^t(\alpha | a\ b) = L^{-1}Q$ is an (N+3)×2 matrix, and wherein | represents concatenation.

According to a further aspect of the invention, calculating g comprises initializing g to an identity mapping, and evaluating $$g(x) \leftarrow a(t)g(x) + b(t) + \sum_{i=1}^{N} \alpha_i(t) f_{\zeta_i(t)}(g(x))$$

for all t=0, ..., T.

According to a further aspect of the invention, updating said curbs for t=T comprises calculating $$\zeta(T) \leftarrow g(\zeta(T)) - \gamma \frac{\partial C_F}{\partial g(\zeta(T))}(g(\zeta(T))),$$

wherein $$C_F(P^I) = \sum_{x,y} (S^F(x, y) - S^M(x, y))^2$$

is said constraint energy, $S^F$ and $S^M$ are structural intensities for a fixed image and a moving image, respectively, wherein $$S^I = \sum_{i \in P^I} v_i^I K * \delta(P_i^I),$$

where δ represents the Dirac distribution, K represents a Gaussian kernel, points $P^I = \{P_1^I, \ldots, P_i^I, \ldots, P_n^I\}$ are points defining the edges of image I, wherein I is either the moving or the fixed image, $v^I = \{v_1^I, \ldots, v_i^I, \ldots, v_n^I\}$ are their associated values, $g(\zeta(T))$ represent the moving points, and γ is a predefined constant.

According to another aspect of the invention, there is provided a program storage device readable by a computer, tangibly embodying a program of instructions executable by the computer to perform the method steps for deformable registration of 2 digital images.

BRIEF DESCRIPTION OF THE DRAWINGS

FIGS. 3(a)-(b) depict a case of matching one point to another, where one point is moving, according to an embodiment of the invention.

FIGS. 4(a)-(b) depict another case of matching one point to another, where one point is staying still, according to an embodiment of the invention.

FIGS. 5(a)-(b) depict a case of matching 2 points in a void with overlapping kernels, according to an embodiment of the invention.

FIGS. 6(a)-(b), which depicts the case of 2 points in a void with overlapping kernels, according to an embodiment of the invention.

FIGS. 7(a)-(b) depicts images used for testing a registration according to an embodiment of the invention.

FIGS. 8(a)-(c) depict results obtained on registering the cut "C" to the full "C", according to an embodiment of the invention.

FIGS. 9(a)-(c) depict results obtained on registering the full "C" to the cut "C", according to an embodiment of the invention.

DETAILED DESCRIPTION OF EXEMPLARY EMBODIMENTS

Figure 1:
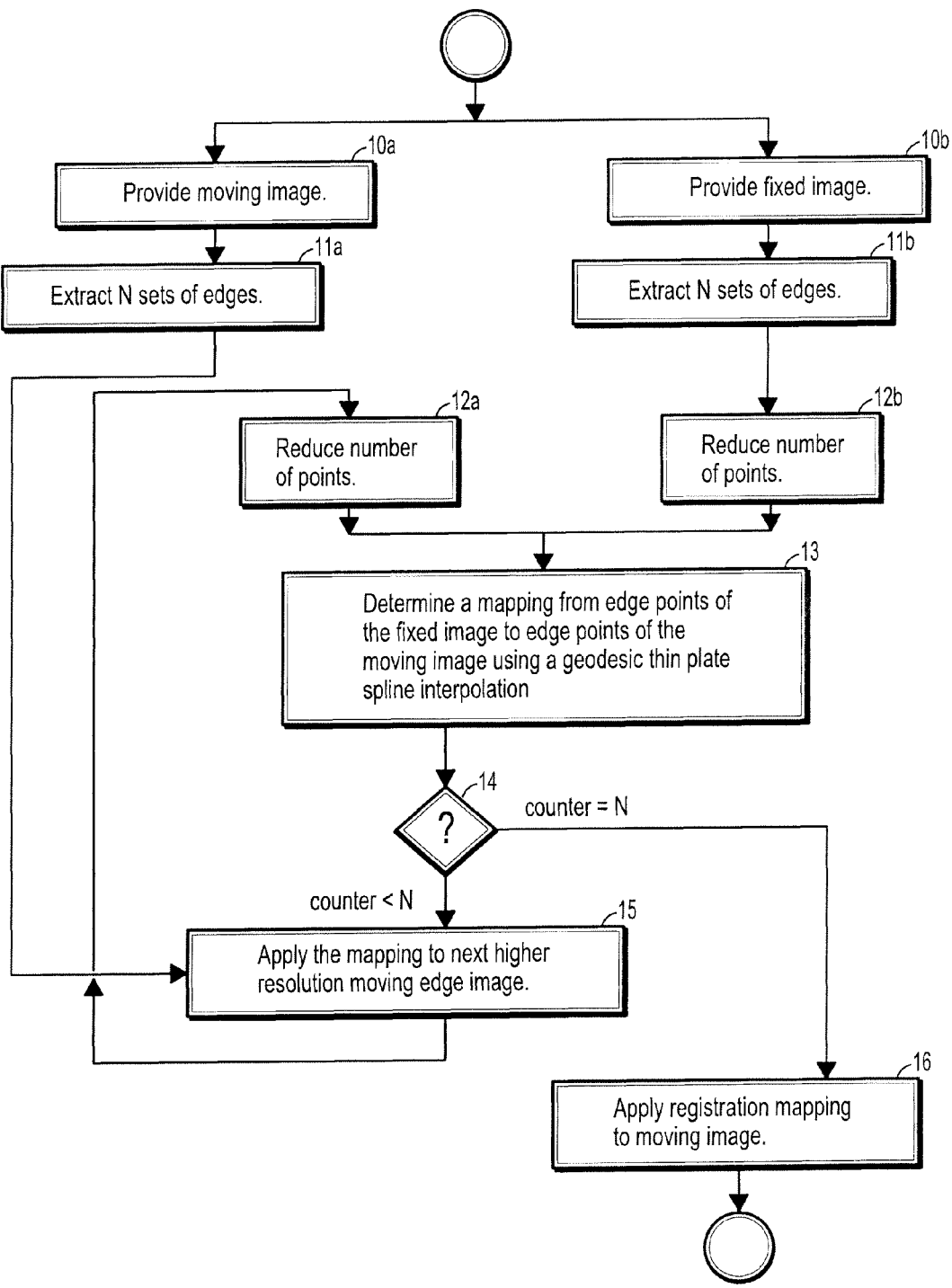
FIG. 1 is a flowchart of a registration method according to an embodiment of the invention.

Exemplary embodiments of the invention as described herein generally include systems and methods for image registration using geodesic image matching. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Gaussian Pyramid

Figure 2:
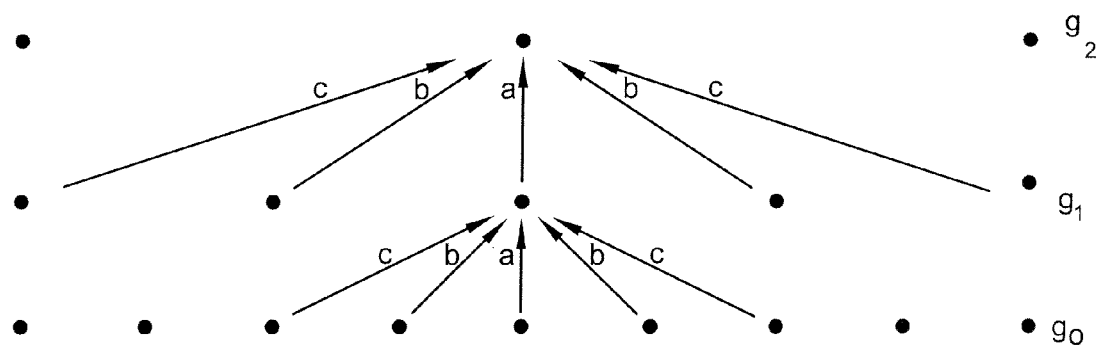
FIG. 2 depicts an exemplary, non-limiting Gaussian pyramid according to an embodiment of the invention.

The process of Gaussian pyramid is simple. The idea behind it is to progressively blur an image and to work first on the blurriest image. The lower one is in the pyramid, the lower the frequencies to be registered. According to an embodiment of the invention, the image size is divided by 2 after each blur. An exemplary, non-limiting Gaussian pyramid is shown in FIG. 2. A Gaussian pyramid uses a Gaussian filter to blur the images. FIG. 2 depicts an exemplary, non-limiting filter of size 5×5 pixels, with a standard deviation of 1.6 pixels. Five pixels at the highest resolution level $g_0$ map to one pixel at a next lower resolution level $g_1$, and five pixels at resolution level $g_0$ map to 1 pixel at the next lower resolution level $g_2$.

Canny Edge Detection

According to an embodiment of the invention, the gradient of the image is computed in x and y direction: $\nabla_x I(x, y)$ and $\nabla_y(x, y)$, and then the magnitude of the gradient and its angle with the horizontal direction are stored:

$$M(x,y) = |\nabla_x I(x,y) + i\nabla_y I(x,y)|, \quad (1)$$

$$\Theta(x,y) = \arg ument(\nabla_x I(x,y) + i\nabla_y I(x,y)). \quad (2)$$

According to an embodiment of the invention, $\hat{\Theta}$ is used, which is a discretization of $\Theta$: $\hat{\Theta} \in \{0, \pi/4, \pi/2, 3\pi/4\}$.

An exemplary, non-limiting Canny Edge Detector(M, $\hat{\Theta}$) is as follows.

---
1. G ← M
2. for each x, y in G
3.     do if M(x, y)<M at neighbors in direction $\hat{\Theta}$ (x, y) and $\hat{\Theta}$ (x, y)+π
4.         then G(x, y) ← 0
5.         else G(x, y) ← M(x, y)
6. return G
---

According to an embodiment of the invention, a Matlab version of a Canny Edge Detector can be used, which can eliminate spurious edges by hysteresis thresholding.

Combining Gaussian Pyramid and Canny Edge Detector in a Registration Process

This disclosure will use herein below the convention of superscript F for fixed and M for moving, as it is desired to match a moving image with a fixed image. A superscript s is added to the variables to emphasize the scale. Thus, $X^{M,s}$ represents the variable X for a moving image at scale s.

According to an embodiment of the invention, the edges of two different images are matched at different scales. If there is a set of points $P^M$ defining the edges in the image $I^M$, and a set $P^F$ defining the edges in the image $I^F$, then a registration process according to an embodiment of the invention can be summed up as follows.

Start at the lowest level (i.e. the smallest images).
1. Match $P^{M,s}$ with $P^{F,s}$ and keep the displacement field $F^s$.
2. Upscale the displacement field to $F^{s+1}$.

3. Apply the displacement field $F^{s+1}$ to $P^{M,s+1}$ and store it in $P^{M,s+1}$.

4. Increment s=s+1 and go to 1.

According to an embodiment of the invention, the displacement field is not actually upscaled because it is computed using thin plate spline coefficients, which are not dependent to the scale.

Geodesic Interpolating Splines

Reducing the number of points moving within the image, from all the pixels to only a set of landmarks, can reduce the computational cost of the registration. But it is desired to generate a dense mapping from the information on the displacement of this limited amount of points and to preserve the consistency of the displacement computed for the points in the image which are not in the set of landmarks. To preserve this consistency, the mapping should be one-to-one, and to prevent any folding or tearing of the mapping from happening, the mapping should be diffeomorphic. One approach for a numerically efficient way of making an interpolating spline diffeomorphic, described in Camion and Younes, "Geodesic interpolating splines", in EMMCVPR, volume 2134 of Lecture Notes in Computer Science, pages 513-527, Springer, 2001, edited by Figueiredo, Zerubia, and Jain, the contents of which are herein incorporated by reference in their entirety, is as follows.

First, some notation. Here $\Omega$ is a bounded set in the plane, H is a Hilbert space of $\Omega$, $\langle,\rangle$ is an inner product on H, and $(p_1, \ldots, p_N)$ and $(q_1, \ldots, q_N)$ are two sets of matching landmarks in $\Omega$.

A goal according to an embodiment of the invention is to find a diffeomorphism $g \epsilon \Omega$ such that:

$$\forall i \epsilon [1, N], \; g(p_i) \cong q_i, \tag{3}$$

or more specifically, an approximate matching which fits best the diffeomorphism condition and the constraints on the landmarks matching.

Interpolating Splines

The task of approximate matching using interpolating splines is finding a g such as:

$$g = \underset{h \in H}{\operatorname{argmin}} \left\{ \|h\|^2 + \lambda \sum_{i=1}^{N} (\langle f_{p_i}, h \rangle - q_i)^2 \right\}. \tag{4}$$

For a fixed $\lambda > 0$, and where $f_1, \ldots, f_N \epsilon H$ is a set of functions to which the mapping should be as close as possible in the locations of the landmarks. That is to say, if there is a basis function $f_{p_i}$ centered on $p_i$, the projection of h of this function should be as close as possible to $q_i$.

The parameter $\lambda$ will be referred to as the smoothness, since reducing this parameter reduces the effect of the constraints, resulting in a smoother mapping. The solution should be searched in the space spanned by $f_{p_1}, \ldots, f_{p_N}$ so the unknown mapping can be expressed as a linear combination of $f_i$:

$$g = \sum_{i=1}^{N} \alpha_i f_{p_i} \tag{5}$$

If one defines the matrix S such as $S_{i,j} = \langle f_{p_i}, f_{p_j} \rangle$, then the task becomes: find $\omega$ such as:

$$\omega = \arg\min \{{}^t\alpha S\alpha + \lambda{}^t(S\alpha - q)(S\alpha - q)\}, \tag{6}$$

where $\alpha$ and $q$ are vectors with respective components $\alpha_i$ and $q_i$.

Since it is desired to find a function h as smooth as possible, one can evaluate this smoothness using an operator L. Define a Hilbert space $H_L$ such that the inner product is:

$$\langle f, g \rangle_L = \int_\Omega L(f) L(g) \tag{7}$$

and then define the norm on $H_L$ as $\|f\|_L^2 = \langle f, f \rangle_L$.

In this framework one needs to find $f_x \epsilon H_L$, a basis function such that the projection of h on it is equivalent to evaluating h at the point where the basis function is given. That is to say:

$$\forall h \epsilon H_L, \; h(x) = \langle f_x, h \rangle. \tag{8}$$

This task then comprises minimizing $$\|h\|_L + \lambda \sum_{i=1}^{N} (h(p_i) - q_i)^2.$$

The theoretical existence of functions $f_x$ can be proven. For example, one can use a Gaussian as a basis function:

$$G(l) = \exp\left(\frac{-l^2}{\sigma^2}\right), \tag{9}$$

then $$f_x(y) = G(|x - y|). \tag{10}$$

For the purpose of diffeomorphic matching, the use of the Thin Plate Splines as described by Bookstein, "Principal warps: Thin-plate splines and the decomposition of deformations", IEEE Trans. Pattern Anal. Mach. Intell., 11(6):567-585, 1989, the contents of which are herein incorporated by reference in their entirety, provides a simple and computationally efficient way of interpolating. Nonetheless one could use the Gaussian basis and produce a diffeomorphic mapping with the same technique.

Thin Plate Splines

Using the Laplacian operator $\Delta$ in place of the L operator used before, the inner product can be defined as:

$$\langle f, g \rangle = \int_{R^2} \Delta f \Delta g \tag{11}$$

The basis function can then be computed, using:

$$\begin{cases} U(r) = r \log r, \\ f_x(y) = U(|x - y|). \end{cases} \tag{12}$$

There is now the equality up to the addition of an affine function:

$$\forall h \in H_\Delta, \begin{cases} h(x) = \langle f_x, h \rangle \\ h(x) = \int_{R^2} f_x(y) \Delta^2 h(y) dy \end{cases} \tag{13}$$

which provides g up to the addition of an affine function, that is to say:

$$g(x) = ax + b + \sum_{i=1}^{N} \alpha_i f_{p_i}(x). \tag{14}$$

EQ. (6) can be used to find a, b and α as follows. Define:

$r_{i,j} = |p_i - p_j|$, the distance between the points i and j;

- $\alpha = \begin{pmatrix} \alpha_1^x, \dots, \alpha_N^x \\ \alpha_1^y, \dots, \alpha_N^y \end{pmatrix}$;

- $a = \begin{pmatrix} a_1^x & a_2^x \\ a_2^x & a_2^y \end{pmatrix}$ and $b = \begin{pmatrix} b^x \\ b^y \end{pmatrix}$;

define the N×N matrix K of general term $U(r_{i,j})$:

$$K = \begin{bmatrix} 0 & U(r_{1,2}) & \dots & U(r_{1,N}) \\ U(r_{2,1}) & 0 & \dots & U(r_{2,N}) \\ \dots & \dots & \dots & \dots \\ U(r_{N,1}) & U(r_{N,2}) & \dots & 0 \end{bmatrix}; \quad (15)$$

define $K_\lambda = K + 1/\lambda K$ where $\lambda$ is the parameter given in EQ. (6), and define the 3×N matrix P:

$$P = \begin{bmatrix} 1 & p_1^x & p_1^y \\ 1 & p_2^x & p_2^y \\ \dots & \dots & \dots \\ 1 & p_N^x & p_N^y \end{bmatrix}; \quad (16)$$

one can then define the (N+3)×(N+3) matrix L:

$$L = \begin{bmatrix} K_\lambda & P \\ {}^tP & O \end{bmatrix} \quad (17)$$

where O is a 3×3 matrix of zeros. Now if $$Q = {}^t\begin{pmatrix} q_1^x, \dots, q_N^x, 000 \\ q_1^y, \dots, q_N^y, 000 \end{pmatrix},$$

then, it can be shown that $${}^t(\alpha|ab) = L^{-1}Q, \quad (18)$$

which is an (N+3)×2 matrix, where | represents concatenation, is a solution to EQ. (6). This defines Thin Plate Spline interpolation, according to an embodiment of the invention. The next section describes how to make this interpolation diffeomorphic.

Diffeomorphic Landmark Matching

A method according to an embodiment of the invention combines the theory of diffeomorphism groups, generated as flows on Ω and thus solutions of an ordinary differential equation, with interpolating splines. The cost of a deformation g, can be defined as the sum of infinitely small costs, representing small deformations. Let $d(t_1, \cdot), \dots, d(t_T, \cdot)$ represent small displacements which incrementally lead to g. Then incrementally applying the deformation function $\Psi(t_k, \cdot)$ leads to the desired deformation:

$$\begin{cases} h_0 = id, \\ h_k(\ ) = \psi(t_k, \cdot) \circ h_{k-1}(\ ). \end{cases} \quad (19)$$

The constrain $h_T = g$ is given in order to lead to the solution. Then one can write the energy Γ of this transformation as:

$$\Gamma = \sum_{k=1}^{T} \|d(t_k)\|^2. \quad (20)$$

Now consider a continuous variable $t \in [0,1]$, which corresponds to having $t_{T \to \infty} \sim t_k/T$, and:

$v(t,\cdot)_{T \to \infty} \sim d(T \cdot t)/T,$ $h(t,\cdot)_{T \to \infty} \sim h(T \cdot t), \quad (21)$ then EQ. (19) becomes:

$$\begin{cases} \frac{\partial h}{\partial t}(t,) = v(t, h(t,)) \\ h(0,) = id \\ h(T,) = g \end{cases} \quad (22)$$

and the energy becomes $$\Gamma(v) = \int_0^1 \|v(t)\|^2 dt. \quad (23)$$

The knowledge of v thus allows one to determine g by integration of an ordinary differential equation.

Now, add the spline requirements to the equation. Let $\forall i \in [1,N]$, $\zeta_i(t)$ be curbs of Ω parameterized by t. These are in association with the flow paths v(t) leading from the landmark points $p_i$ to the landmark points $q_i$. That is to say:

$$\begin{cases} \zeta_i(0) = p_i, \\ \zeta_i(1) = q_i. \end{cases} \quad (24)$$

According to an embodiment of the invention, the energy of this path can be minimized by:

$$E(v, \zeta_1, \dots, \zeta_N) = \int_0^1 \int_\Omega |Lv(t)|^2 dx dt + \sum_{i=1}^N \int_0^1 \left| \frac{d\zeta_i}{dt}(t) - v(t, \zeta_i(t)) \right|^2. \quad (25)$$

There is also here defined a geodesic distance between two set of points $I = (p_1, \dots, p_N)$ and $I' = (q_1, \dots, q_N)$, which is:

$$d(I,I') = \operatorname{Inf}\{\sqrt{E(v,\zeta)}, v \in H_L, \zeta(0) = I, \zeta(1) = I'\} \quad (26)$$

Geodesic interpolating Thin Plate Splines

Now, for each infinitely small displacement $v(t, \cdot)$ as defined in EQ. (21) is required to be a Thin Plate Spline mapping. Following EQ. (14), v is then:

$$v(t, x) = a(t)x + b(t) + \sum_{i=1}^N \alpha_i(t) f_{\zeta_i(t)}(x) \quad (27)$$

One can combine the energy in EQ. (25) with the flow of EQ. (27), using U defined in EQ. (12) and discretizing for t∈[0,T]:

$$E(\alpha, \zeta) = \sum_{i,j=1}^{N} \sum_{t=0}^{T} \langle \alpha_i(t), \alpha_j(t) \rangle U(|\zeta_i(t) - \zeta_j(t)|) + \lambda \sum_{i=1}^{N} \sum_{t=0}^{T-1} \|Z_i(t)\|^2, \quad (28)$$

with:

$$Z_i(t) = D_t(\zeta_i) - a(t)\zeta_i(t) - b(t) - \sum_{k=1}^{N} \alpha_k U(|\zeta_k(t) - \zeta_i(t)|) \quad (29)$$

and for any time dependent function u, $$\forall t \in [0, T-1], \, D_t(u) = T \times (u(t+1) - u(t)). \quad (30)$$

An exemplary, non-limiting two step algorithm according to an embodiment of the invention which converges for minimizing the energy of EQ. (28) is as follows.

GEODESIC THIN PLATE SPLINES ((p$_1$, . . . , p$_N$), (q$_1$, . . . , q$_N$), β):

1. $\forall t \in [0, T], \, \alpha(t) \leftarrow 0$

2. $\forall t \in [0, T], \, b(t) \leftarrow 0$

3. $\forall t \in [0, T], \, a(t) \leftarrow \begin{pmatrix} 1 & 0 \\ 0 & 1 \end{pmatrix}$ 4. $\forall i \in [1, N], \forall t \in [0, T], \, \zeta_i(t) = p_i + \frac{t}{T}(q_i - p_i)$ 5. repeat 6. $i \in [1, N], \forall t \in [2, T-1], \, \zeta_i(t) \leftarrow \zeta_i(t) - \beta \frac{\partial E}{\partial \zeta_i(t)}$ 7. L is built using EQ. (17), where P is the matrix defined using ζ(t−1)

8. $\forall t \in [1, T-1], \, {}^t(\alpha(t) | a(t)b(t)) = L^{-1}\zeta(t)$ 9. until convergence
10. return α, a, b, ζ

Here one just needs to write the derivative of E with respect to ζ:

$$\forall i \in [1, N], \, \frac{\partial E}{\partial \zeta_i(t)} = 2\sum_{j=1}^{N} \langle \alpha_i(t), \alpha_j(t) \rangle \nabla_1 U(|\zeta_j(t) - \zeta_i(t)|) -$$

$$2\lambda \sum_{j=1}^{N} (\langle \alpha_i(t), Z_j(t) \rangle + \langle \alpha_j(t), Z_i(t) \rangle) \nabla_1 U(|\zeta_j(t) - \zeta_i(t)|) -$$

$$2\lambda^t a(t) Z_i(t) - 2\lambda T D_{t-1}(Z_i), \quad (31)$$

where $\nabla_1 U \in R$ denotes the gradient of U with respect to one of its variables (it does not matter which one since the mapping (a,b)↦U(|a−b|) is symmetric). The points in the path define, for each time t, where the points have moved since the time t−δt. To recover the complete deformation, one sums the induced infinitely small deformations, which is equivalent to resolving the ODE of EQ. (22).

Geodesic Matching with Free Extremities

In this section, it will be shown that a registration framework according to an embodiment of the invention can be viewed as a matching task with free extremities.

In the last section the minimization process was performed with fixed extremities that are the initial and target points. However, in a registration process according to an embodiment of the invention, it is desired to move the initial points toward a set of final points without any known correspondence, or even without knowing if the repartition of the points or their number is consistent with each other. Assuming one can define a constraint $C_{Image}(I')$ which describes how far from the target image the set of points is, one can then can use the framework given by Garcin and Younes, "Geodesic matching with free extremities", J. Math. Imaging Vis., 25(3): 329-340, 2006, the contents of which are herein incorporated by reference in their entirety, where not only the minimizing paths between two set of points are unknown but where the paths' extremities themselves are unknown.

It has been shown that a constraint should be enforced on each extremity of the path to have a well posed problem. According to an embodiment of the invention, a soft constraint will be used on one of the extremities and a hard constraint on the other, to minimize the energy:

$$E_{matching}(I,I') = d(I,I')^2 + C_{Image}(I'), \quad (32)$$

with the hard constraint:

$$\forall i \in [1,N], \, I_i = P_i, \quad (33)$$

where d(I, I') is defined in EQ. (26) and $C_{Image}(I')$ is yet to be defined.

Kernel Matching

Let $P^I$ be a set of points defining the edges of an image I. The 'Structural Intensity' of an image I, $S^I$, can be defined as the convolution by a Gaussian kernel of an image formed only by the points $P^I = \{P_1^I, \ldots, P_i^I, \ldots, P_n^I\}$ and their associated values $v^I = \{v_1^I, \ldots, v_i^I, \ldots, v_n^I\}$. That is to say, if δ represents the Dirac distribution, and K represents the Gaussian kernel, one has:

$$S^I = \sum_{i \in P^I} v_i^I K * \delta(P_i^I). \quad (34)$$

So, matching points has been replaced with matching 'Structural Intensities'. A measure can be defined between two 'Structural Intensities', with superscript F for the fixed image and M for the moving image, as:

$$E = \sum_{x,y} (S^F(x,y) - S^M(x,y))^2, \quad (35)$$

which with EQ. (34) expands and gives the constraint energy:

$$C_F(P^M) = \sum_{x,y} \left( S^F(x,y) - \left[ \sum_{i \in P^M} v_i^M K * \delta(P_i^M) \right](x,y) \right)^2. \quad (36)$$

Now, EQ. (36) can be derived with respect to the position of each point in $P^M$ to carry out the gradient descent on each point's position:

$$\frac{\partial C_F}{\partial P_j^M} = \quad (37)$$

$$-2\sum_{x,y}\left(S^F - \left[\sum_{i\in P^M} v_i^M K * \delta(P_i^M)\right]\right) \times v_j^M \nabla K * \delta(P_i^M)$$

with:

$$\nabla K = \begin{pmatrix} \frac{\partial K}{\partial x} \\ \frac{\partial K}{\partial y} \end{pmatrix} = \begin{pmatrix} \frac{-x}{\sigma^2}\exp\left(\frac{-(x^2+y^2)}{2\sigma^2}\right) \\ \frac{-y}{\sigma^2}\exp\left(\frac{-(x^2+y^2)}{2\sigma^2}\right) \end{pmatrix}. \quad (38)$$

Experiments

FIGS. 3, 4, and 5 present results of solving these equations without regularization with the Geodesic Splines. FIGS. 3(*a*)-(*b*) depict a case of matching one point to another, where one point is moving. FIGS. 4(*a*)-(*b*) depict another case of matching one point to another, where one point is staying still. FIGS. 5(*a*)-(*b*) depict a case of matching 2 points in a void with overlapping kernels. In each of these cases, the (b) figure is a closer look at an outlined square(s) 31, 41, 51*a*, 51*b* of the (a) figure. The images 32, 42, 52 seen underneath are the fixed 'structural intensities'. On top of the structural intensity, each outlined square 31, 41, 51*a*, 51*b* represents the kernel surrounding a point 33, 43, 53*a*, 53*b*, and the arrow 34, 44, 54*a*, 54*b* starting from the center of each square and ending in a cross, shows the movement of this point in one iteration.

In FIGS. 3 and 4, it can be seen that when the kernel surrounding a point and the kernel of the fixed image are overlapping, as in FIGS. 3(*a*)-(*b*), the point is moving. When there is no overlap, as in FIGS. 4(*a*)-(*b*), there is no movement, and this is a consequence of the equations.

Another consequence of the equations is the fact that when, for example, two points are away from the information of the fixed image, but have overlapping kernels, as shown in FIGS. 5(*a*)-(*b*), these two points tend to move away from one another to not overlap. If there are many points in a void, they will tend to spread quickly on the void, thus disrupting the contour. The points are moving whereas there is no information available from the fixed image.

Modified Kernel Matching

One can add a rule to the movement of the points: a point $P_i^M$ is allowed to move only if:

$$K * \delta(P_i^M) \cap \bigcup_j (K * \delta(P_j^F)) \neq \{\emptyset\}. \quad (39)$$

Defining $\hat{P}$ as:

$$\hat{P} = \left\{ k \in N \mid K * \delta(P_k^M) \cap \bigcup_j (K * \delta(P_j^F)) \neq \{\emptyset\} \right\} \quad (40)$$

implies the following energy:

$$C_F(P^M) = \sum_{x,y}\left(S^F(x,y) - \left[\sum_{i\in \hat{P}} v_i^M K * \delta(P_i^M)\right](x,y)\right)^2. \quad (41)$$

In other words, if a moving kernel has no information underneath, if it is not intersecting with the fixed image, then the point related to this kernel should not move, hence not be computed within the energy. FIGS. 6(*a*)-(*b*), which depicts the case of 2 points 63*a*, 63*b* in a void with overlapping kernels 61*a*, 61*b*, show that this change has the desired effect, with FIG. 6(*a*) depicting points staying still, and FIG. 6(*b*) is a closer look at the outlined squares 61*a*, 61*b* of FIG. 6(*a*).

A Geodesic Thin Plate Spline algorithm according to an embodiment of the invention presented above can be modified to take into account the constraint of the image which leads the points. Exemplary, non-limiting pseudo-code for such an algorithm is as follows.

GEODESIC THIN PLATE SPLINES(($p_1, \ldots, P_N$) Image F, $\gamma$, $\beta$):

| | |
|---|---|
| 1. | $\forall t \in [0, T], \alpha(t) \leftarrow 0$ |
| 2. | $\forall t \in [0, T], b(t) \leftarrow 0$ |
| 3. | $\forall t \in [0, T], a(t) \leftarrow \begin{pmatrix} 1 & 0 \\ 0 & 1 \end{pmatrix}$ |
| 4. | $\forall i \in [1, N], q_i = p_i - \gamma \frac{\partial C_F}{\partial p_i}(p_i, \ldots, p_N)$ |
| 5. | $\forall i \in [1, N], \forall t \in [0, T], \zeta_i(t) = p_i + \frac{t}{T}(q_i - p_i)$ |
| 6. | repeat |
| 7. | $i \in [1, N], \forall t \in [2, T-1], \zeta_i(t) \leftarrow \zeta_i(t) - \beta\frac{\partial E}{\partial \zeta_i(t)}$ |
| 8. | L is built using EQ. (17). where P is the matrix defined using $\zeta(t-1)$ |
| 9. | $\forall t \in [1, T-1], \, {}^t(\alpha(t) \mid a(t)b(t)) = L^{-1}\zeta(t)$ |
| 10. | h ← GEODESIC TPS GET WARP ($\zeta, \alpha, a, b$) |
| 11. | $\zeta(T) \leftarrow h(\zeta(T)) - \gamma\frac{\partial C_F}{\partial h(\zeta(T))}(h(\zeta(T)))$ |
| 12. | until convergence |
| 13. | return $\zeta(T)$, h |

GEODESIC TPS GET WARP ($\zeta, \alpha, a, b$):

| | |
|---|---|
| 1. | g ← id |
| 2. | for t ← 0 to T |
| 3. | do $g(x) \leftarrow a(t)g(x) + b(t) + \sum_{i=1}^{N}\alpha_i(t)f_{\zeta_i(t)}(g(x))$ |
| 4. | return g |

At convergence, $\zeta(T)$ represents the image of the initial points transformed by the deformation h.

Points Number Reduction

Referring back to steps 12*a*, 12*b* of FIG. 1, even if the amount of data used is reduced by taking only the edges of the image as the only registration guide, it can be seen during the registration process that fewer points evenly distributed on the edges will give similar results. Points that are located on corners and on highly curbed edges have more effect on the registration than other points. Indeed the variations in the curve denote higher frequencies, so it seems consistent to have a higher frequency of points in these areas. From these observations filtering scheme may be set up to eliminate the less useful points.

The variations of the curve are directly linked to the second derivative of the parameterized curve, in that there is a density of points linked to the norm of the second derivative at each point. However, it is simpler and computationally more efficient to use a heuristic based on the angle of curvature when one follows a curve drawn by the points.

An exemplary, non-limiting algorithm for point number reduction according to an embodiment of the invention is as follows, presented here with a recursive function for the sake of comprehensiveness. This algorithm follows each of the curves in the edges to keep only one point every α, and keep the points where the angle made by three points in β points, is greater than θ.

POINTS FILTERING (AllPoints)

```
1. X ← AllPoints
2. while X≠0
3.      do [sparseChain, X] = GetChain(X, nodePoint ← first)
4. remainingPoints ← {AllPoints \ sparseChain }
5. return remainingPoints, sparseChain
```

GETCHAIN (AllPoints, nodePoint):

```
1. sparseChain[1] ← AllPoints[nodePoint]
2. sparseIndex←1
3. memory[1] ← AllPoints[nodePoint]
4. AllPoints ← {AllPoints \ AllPoints[nodePoint]}
5. i ← 1
6. repeat
7.      i ← i+1
8.      // vector of all the distances
9.      dist ← DISTANCE(AllPoints, memory[i])
10.     // vector of indices of all the points in the eight-neighborhood
11.     index₁ ← FIND(dist ≤ √2)
12.     memory[i] ← AllPoints[index₁[1]]
13.     AllPoints ← {AllPoints \ AllPoints[index₁[1]]}
14.     if i > α
15.         then if    ANGLE(memory[i- α ], memory[i- α /2],
                       memory[i])> θ
16.             sparseChain[sparseIndex] ← memory[i- α ]]
17.             sparseIndex ← sparseIndex + 1
18.     if MODULO(i, β)
19.         then      sparseChain[sparseIndex] ← memory[i- β /2]
20.                   sparseIndex ← sparseIndex + 1
21.     if LENGTH(index₁) ≠ 1
22.     then
23.             dist ← DISTANCE(AllPoints, memory[i-1])
24.             index₂ ← find(dist ≤ √2)
25.     for j ← 1 to LENGTH(index₂)
26.         do        [a, b, AllPoints] ← GETCHAIN(AllPoints,
                      index₂[j])
27.                   sparseChain ← {sparseChain | a}
28.                   memory ← {memory | b}
29.                   i ← SIZE(memory)
30.                   sparseIndex ← SIZE(sparseChain)
31. until index₁ = 0;
32. return sparseChain, memory, AllPoints
```

Results

FIGS. 8-11 show results obtained with an algorithm according to an embodiment of the invention on the letter 'C'. The original images are shown in FIGS. 7(a)-(b). This test image involves the completion of the cut 'C', shown in FIG. 7(b), which is a full dilatation as opposed to the full contraction of the reverse process. A full dilatation and full contraction are attempted, with the same parameters, to see if an algorithm according to an embodiment of the invention can perform both ways.

FIGS. 8(a)-(c) depict results obtained on registering the cut "C" to the full "C". FIGS. 9(a)-(c) depict results obtained on registering the full "C" to the cut "C". Three types of images are shown: the moving points 81, 91 on the fixed edge 82, 92 in the (a) figure, the deformation field after registration in the (b) figure, and finally the difference image in the (c) figure. In the (c) figures, the surrounding gray areas 83, 93 are null.

Figure 10:
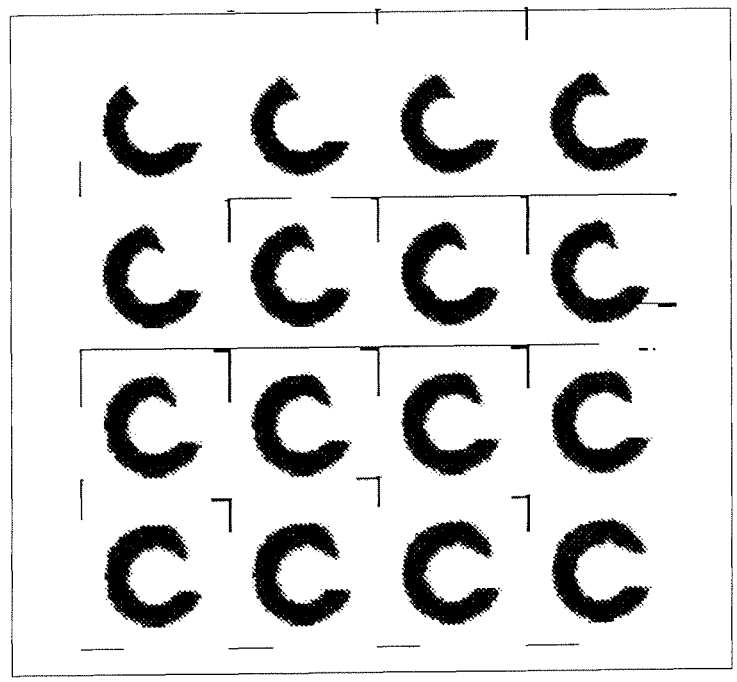
FIG. 10 shows the steps of the completion of the cut "C" to the full "C", according to an embodiment of the invention.
Figure 11:
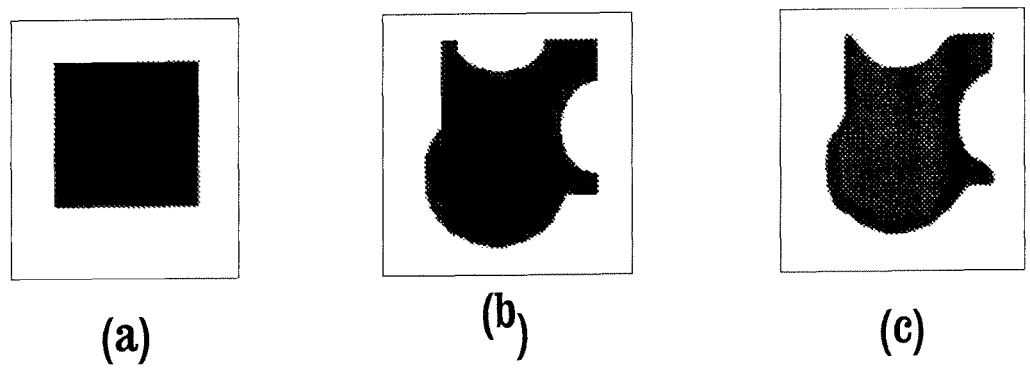
FIGS. 11(a)-(c) show the same type of experiment involving the registration of a bubbled square, according to an embodiment of the invention.

An algorithm according to an embodiment of the invention can interpolate the 'natural' movement of the 'C'. FIG. 10 shows the steps of the completion of the cut "C" to the full "C", showing the interpolation of the movement of the edges.

FIGS. 11(a)-(c) show the same type of experiment involving the registration of a bubbled square. FIG. 11(a) depicts the original square, the moving image in this case, FIG. 11(b) depicts the deformed image, which is taken as the fixed image, and FIG. 11(c) depicts the registration result.

Figure 12:
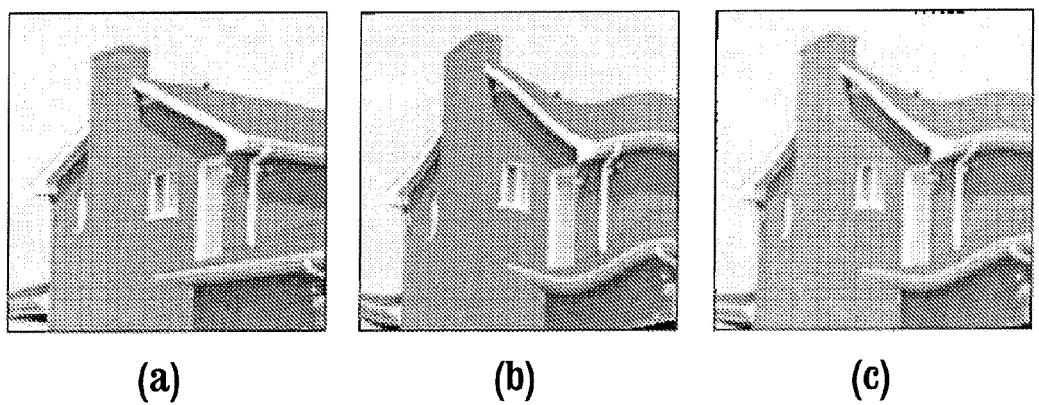
FIGS. 12(a)-(c) depict the results obtained for the registration of a house to which was applied a known deformation, according to an embodiment of the invention.

FIGS. 12(a)-(c) depict the results obtained for the registration of a house to which was applied a known deformation. FIG. 12(a) is the original house, which is the moving image, FIG. 12(b) depicts the deformed house, which is the fixed image, and FIG. 12(c) depicts the registration result.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 13:
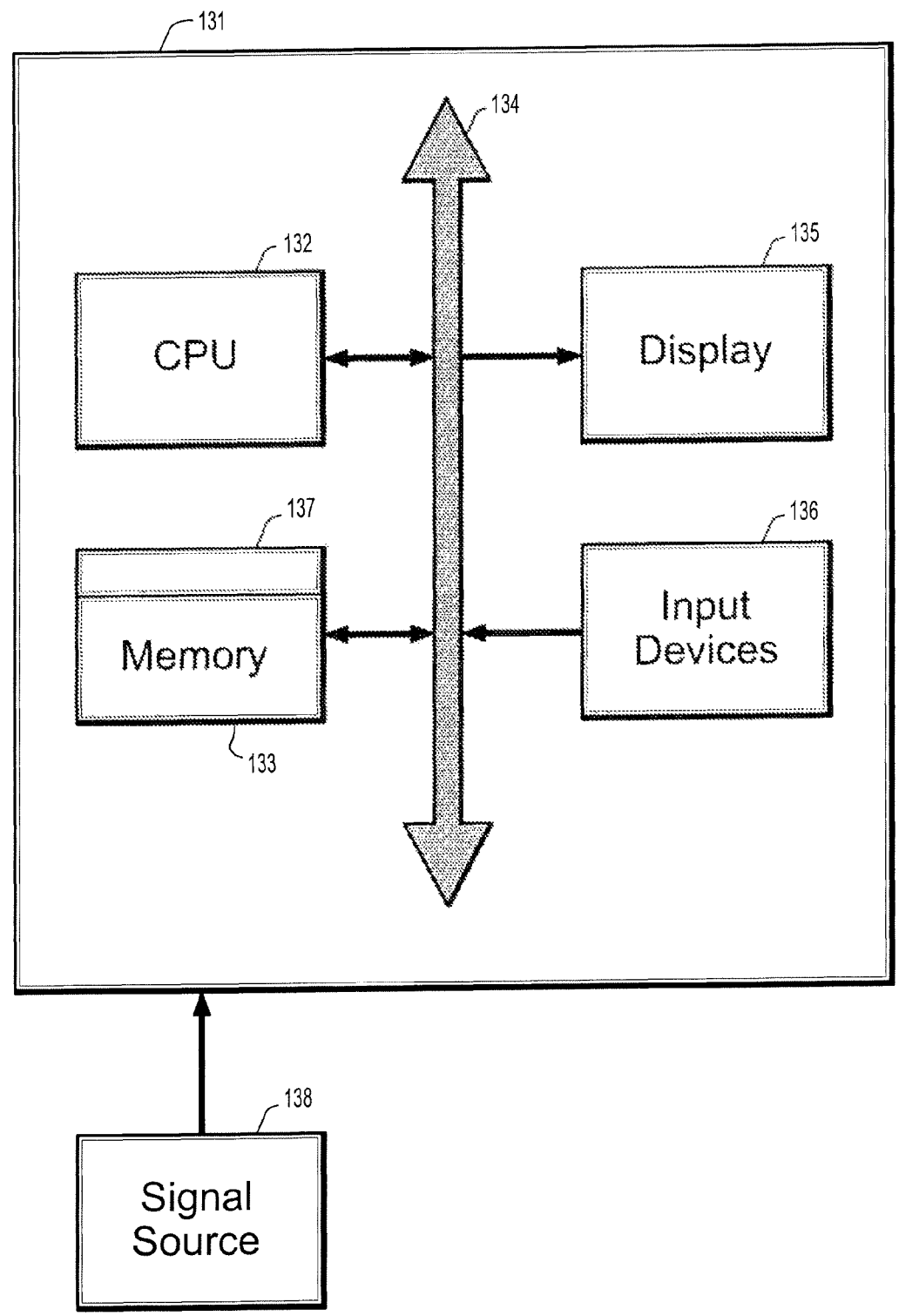
FIG. 13 is a block diagram of an exemplary computer system for implementing a method for image registration using geodesic image matching, according to an embodiment of the invention.

FIG. 13 is a block diagram of an exemplary computer system for implementing a method for image registration using geodesic image matching, according to an embodiment of the invention. Referring now to FIG. 13, a computer system 131 for implementing the present invention can comprise, inter alia, a central processing unit (CPU) 132, a memory 133 and an input/output (I/O) interface 134. The computer system 131 is generally coupled through the I/O interface 134 to a display 135 and various input devices 136 such as a mouse and a keyboard. The support circuits can include circuits such as cache, power supplies, clock circuits, and a communication bus. The memory 133 can include random access memory (RAM), read only memory (ROM), disk drive, tape drive, etc., or a combinations thereof. The present invention can be implemented as a routine 137 that is stored in memory 133 and executed by the CPU 132 to process the signal from the signal source 138. As such, the computer system 131 is a general purpose computer system that becomes a specific purpose computer system when executing the routine 137 of the present invention.

The computer system 131 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for deformable registration of 2 digital images, comprising the steps of:
   providing a pair of edge images, said pair including a fixed edge image and a moving edge image, each said edge image comprising a set of edge points extracted from a corresponding 2-dimensional digital image;
   initializing moving points $q_i$ from fixed points $p_i$, wherein said fixed points are selected from said fixed edge image;
   initializing a set of N 2-dimensional curbs $\zeta_i(t)$, $i \in [1,N]$, on a domain of said edge images parameterized by $t \in [0,T]$ associated with paths from said fixed points $p_i$ to moving points $q_i$ wherein $$\zeta_i(t) = p_i + \frac{t}{T}(q_i - p_i);$$

updating said curbs for parameters $t \in [2,T-1]$ using a gradient descent of an energy associated with paths from said landmark points $p_i$ to landmark points $q_i$;
   calculating from said curbs for parameters $t \in [2,T-1]$ a set of coefficients $a$, $b$, $\alpha$ that define a diffeomorphic function $g$ defined on said image domain wherein $$g(p_i) \doteq q_i, \forall i \in [1, N], \text{ and } g(x) = ax + b + \sum_{i=1}^{N} \alpha_i f_{p_i}(x),$$

wherein $a$ is a 2×2 matrix, $b$ is a 2D vector, $\alpha$ is a 2×N matrix, and $f_p(x)$ are a set of basis functions;
   calculating $g$ from said coefficients;
   updating said curbs for $t=T$ from said diffeomorphic function $g$ and a gradient descent of said constraint energy calculated for points transformed by $g$; and
   repeating said steps of updating said curbs for parameters $t \in [2,T-1]$, calculating said coefficients $a$, $b$, $\alpha$, calculating $g$, and updating said curbs for $t=T$ until $g$ converges, wherein $g$ is a deformation field that maps said fixed edge points to said moving edge points, and said curbs for $t=T$ represent the image of the initial points as transformed by $g$.

2. The method of claim 1, wherein each corresponding digital image comprises a plurality of intensities associated with a 2-dimensional grid of points, and further comprising extracting a set of edge images from said corresponding pair of digital images, each edge set being extracted at a different resolution;
   selecting a pair of edge images with a lowest resolution;
   applying said deformation field mapping to a next higher resolution edge point image of said moving image;
   selecting a pair of edge images at a next higher resolution, wherein a moving edge image is the moving edge image to which said mapping has been applied;
   calculating a deformation field and set of curbs for each set of next higher resolution edge images; and
   applying said mapping to an entire moving image.

3. The method of claim 1, wherein the $q_i$ are initialized as $$q_i = p_i - \lambda \frac{\partial C_F}{\partial p_i}(p_i, \ldots, p_N),$$

wherein $$C_F(P^I) = \sum_{x,y} (S^F(x, y) - S^M(x, y))^2$$

is said constraint energy, $S^F$ and $S^M$ are structural intensities for a fixed image and a moving image, respectively, wherein $$S^I = \sum_{i \in P^I} v_i^I K * \delta(P_i^I),$$

where $\delta$ represents the Dirac distribution, K represents a Gaussian kernel, points $P^I = \{P_1^I, \ldots, P_i^I, \ldots, P_n^I\}$ are points defining the edges of image I, wherein I is either the moving or the fixed image, $v^I = \{v_1^I, \ldots, v_i^I, \ldots, v_n^I\}$ are their associated values, and $\gamma$ is a predefined constant.

4. The method of claim 3, wherein points in the moving set are constrained to be in a set $$\hat{P} = \left\{ k \in N \mid K * \delta(P_k^M) \cap \bigcup_j (K * \delta(P_j^M)) \neq \{\emptyset\} \right\}.$$

5. The method of claim 1, wherein updating said curbs for parameters $t \in [2,T-1]$ using a gradient descent comprises calculating $$\zeta_i(t) \leftarrow \zeta_i(t) - \beta \frac{\partial E}{\partial \zeta_i(t)}$$

wherein $$E(\alpha, \zeta) = \sum_{i,j=1}^{N} \sum_{t=0}^{T} \langle \alpha_i(t), \alpha_j(t) \rangle U(|\zeta_i(t) - \zeta_j(t)|) + \lambda \sum_{i=1}^{N} \sum_{t=0}^{T-1} \|Z_i(t)\|^2,$$

wherein $U(r) = r \log r$, $$Z_i(t) = D_t(\zeta_i) - a(t)\zeta_i(t) - b(t) - \sum_{k=1}^{N} \alpha_k U(|\zeta_k(t) - \zeta_i(t)|),$$

wherein for any time dependent function u, $D(u) = T \times (u(t+1) - u(t))$, $t \in [0,T-1]$, and $\beta$ is a predefined constant.

6. The method of claim 1, wherein calculating said coefficients $a$, $b$, $\alpha$ comprises:
   forming a 3×N matrix $$P = \begin{bmatrix} 1 & \zeta_1^x(t-1) & \zeta_1^y(t-1) \\ 1 & \zeta_2^x(t-1) & \zeta_2^y(t-1) \\ \ldots & \ldots & \ldots \\ 1 & \zeta_N^x(t-1) & \zeta_N^y(t-1) \end{bmatrix};$$

forming an N×N matrix K of $U(r_{i,j})$ as $$K = \begin{bmatrix} 0 & U(r_{1,2}) & \ldots & U(r_{1,N}) \\ U(r_{2,1}) & 0 & \ldots & U(r_{2,N}) \\ \ldots & \ldots & \ldots & \ldots \\ U(r_{N,1}) & U(r_{N,2}) & \ldots & 0 \end{bmatrix},$$

and matrix $K_\lambda = K+1/\lambda K$ wherein $\lambda$ is a smoothness parameter greater than 0, $r_{i,j}=|p_i-p_j|$ is a distance between the points i and j, and $U(r)=r \log(r)$, forming a 3×3 matrix of zeros O;
forming a (N+3)×(N+3) matrix $$L = \begin{bmatrix} K_\lambda & P \\ {}^tP & O \end{bmatrix};$$

calculating $L^{-1}Q$ wherein $$Q = {}^t\begin{pmatrix} \zeta_1^x(t), \ldots, \zeta_N^x(t), 000 \\ \zeta_1^y(t), \ldots, \zeta_N^y(t), 000 \end{pmatrix},$$

wherein ${}^t(\alpha|a\ b)=L^{-1}Q$ is an (N+3)×2 matrix, and wherein | represents concatenation.

7. The method of claim 1, wherein calculating g comprises initializing g to an identity mapping, and evaluating $$g(x) \leftarrow a(t)g(x) + b(t) + \sum_{i=1}^{N} \alpha_i(t) f_{\zeta_i(t)}(g(x))$$

for all t=0, . . . , T.

8. The method of claim 1, wherein updating said curbs for t=T comprises calculating $$\zeta(T) \leftarrow g(\zeta(T)) - \gamma \frac{\partial C_F}{\partial g(\zeta(T))}(g(\zeta(T))),$$

$$C_F(P^I) = \sum_{x,y}(S^F(x,y) - S^M(x,y))^2$$

is said constraint energy, $S^F$ and $S^M$ are structural intensities for a fixed image and a moving image, respectively, wherein $$S^I = \sum_{i \in P^I} v_i^I K * \delta(P_i^I),$$

where $\delta$ represents the Dirac distribution, K represents a Gaussian kernel, points $P^I = \{P_1^I, \ldots, P_i^I, \ldots, P_n^I\}$ are points defining the edges of image I, wherein I is either the moving or the fixed image, $v^I = \{v_1^I, \ldots, v_i^I, \ldots, v_n^I\}$ are their associated values, $g(\zeta(T))$ represent the moving points, and $\gamma$ is a predefined constant.

9. A non-transitory program storage device readable by a computer, tangibly embodying a program of instructions executable by the computer to perform the method steps for deformable registration of 2 digital images, said method comprising the steps of:

providing a pair of edge images, said pair including a fixed edge image and a moving edge image, each said edge image comprising a set of edge points extracted from a corresponding 2-dimensional digital image;

initializing moving points $q_i$ from fixed points $p_i$, wherein said fixed points are selected from said fixed edge image;

initializing a set of N 2-dimensional curbs $\zeta_i(t)$, i∈[1,N], on a domain of said edge images parameterized by t∈[0,T] associated with paths from said fixed points $p_i$ to moving points $q_i$ wherein $$\zeta_i(t) = p_i + \frac{t}{T}(q_i - p_i);$$

updating said curbs for parameters t∈[2,T−1] using a gradient descent of an energy associated with paths from said landmark points $p_i$ to landmark points $q_i$;

calculating from said curbs for parameters t∈[2,T−1] a set of coefficients a, b, $\alpha$ that define a diffeomorphic function g defined on said image domain wherein $$g(p_i) \doteq q_i, \forall\ i \in [1, N], \text{ and}$$

$$g(x) = ax + b + \sum_{i=1}^{N} \alpha_i f_{p_i}(x),$$

wherein a is a 2×2 matrix, b is a 2D vector, $\alpha$ is a 2×N matrix, and $f_p(x)$ are a set of basis functions;

calculating g from said coefficients;

updating said curbs for t=T from said diffeomorphic function g and a gradient descent of said constraint energy calculated for points transformed by g; and repeating said steps of updating said curbs for parameters t∈[2,T−1], calculating said coefficients a, b, $\alpha$, calculating g, and updating said curbs for t=T until g converges, wherein g is a deformation field that maps said fixed edge points to said moving edge points, and said curbs for t=T represent the image of the initial points as transformed by g.

10. The computer readable program storage device of claim 9, wherein each corresponding digital image comprises a plurality of intensities associated with a 2-dimensional grid of points, and further comprising extracting a set of edge images from said corresponding pair of digital images, each edge set being extracted at a different resolution;

selecting a pair of edge images with a lowest resolution;

applying said deformation field mapping to a next higher resolution edge point image of said moving image;

selecting a pair of edge images at a next higher resolution, wherein a moving edge image is the moving edge image to which said mapping has been applied;

calculating a deformation field and set of curbs for each set of next higher resolution edge images; and applying said mapping to an entire moving image.

11. The computer readable program storage device of claim 10, the method further comprising reducing a number of points in each of said edge images, prior to determining said mapping.

12. The computer readable program storage device of claim 11, wherein reducing a number of points comprises following a curve defined by a set of edge points, keeping one point every $\alpha$, wherein $\alpha$ is a predetermined distance interval, and keeping those points wherein an angle made by three points in $\beta$ points is greater than $\theta$, wherein $\beta$ is a predetermined number of points and $\theta$ is a predetermined angle.

13. The computer readable program storage device of claim 10, the method further comprising using a Gaussian pyramid to generate images at progressively lower resolutions to extract edge sets at different resolutions.

14. The computer readable program storage device of claim 9, wherein the $q_i$ are initialized as $$q_i = p_i - \gamma \frac{\partial C_F}{\partial p_i}(p_i, \ldots, p_N),$$

wherein $$C_F(P^I) = \sum_{x,y}(S^F(x,y) - S^M(x,y))^2$$

is said constraint energy, $S^F$ and $S^M$ are structural intensities for a fixed image and a moving image, respectively, wherein $$S^I = \sum_{i \in P^I} v_i^I K * \delta(P_i^I),$$

where $\delta$ represents the Dirac distribution, K represents a Gaussian kernel, points $P^I = \{P_1^I, \ldots, P_i^I, \ldots, P_n^I\}$ are points defining the edges of image I, wherein I is either the moving or the fixed image, $v^I = \{v_1^I, \ldots, v_i^I, \ldots, v_n^I\}$ are their associated values, and $\gamma$ is a predefined constant.

15. The computer readable program storage device of claim 14, wherein points in the moving set are constrained to be in a set $$\hat{P} = \left\{ k \in N \mid K * \delta(P_k^M) \cap \bigcup_j (K * \delta(P_j^M)) \neq \{\emptyset\} \right\}.$$

16. The computer readable program storage device of claim 9, wherein updating said curbs for parameters t∈[2,T−1] using a gradient descent comprises calculating $$\zeta_i(t) \leftarrow \zeta_i(t) - \beta \frac{\partial E}{\partial \zeta_i(t)}$$

wherein $$E(\alpha, \zeta) = \sum_{i,j=1}^{N} \sum_{t=0}^{T} \langle \alpha_i(t), \alpha_j(t) \rangle U(|\zeta_i(t) - \zeta_j(t)|) + \lambda \sum_{i=1}^{N} \sum_{t=0}^{T-1} \|Z_i(t)\|^2,$$

wherein $$U(r) = r \log r,$$

$$Z_i(t) = D_t(\zeta_i) - a(t)\zeta_i(t) - b(t) - \sum_{k=1}^{N} \alpha_k U(|\zeta_k(t) - \zeta_i(t)|),$$

wherein for any time dependent function u, $D_t(u) = T \times (u(t+1) - u(t))$, t∈[0,T−1], and $\beta$ is a predefined constant.

17. The computer readable program storage device of claim 9, wherein calculating said coefficients a, b, α comprises:
    forming a 3×N matrix $$P = \begin{bmatrix} 1 & \zeta_1^x(t-1) & \zeta_1^y(t-1) \\ 1 & \zeta_2^x(t-1) & \zeta_2^y(t-1) \\ \ldots & \ldots & \ldots \\ 1 & \zeta_N^x(t-1) & \zeta_N^y(t-1) \end{bmatrix};$$

forming an N×N matrix K of $U(r_{i,j})$ as $$K = \begin{bmatrix} 0 & U(r_{1,2}) & \ldots & U(r_{1,N}) \\ U(r_{2,1}) & 0 & \ldots & U(r_{2,N}) \\ \ldots & \ldots & \ldots & \ldots \\ U(r_{N,1}) & U(r_{N,2}) & \ldots & 0 \end{bmatrix},$$

matrix $K_\lambda = K + 1/\lambda K$ wherein $\lambda$ is a smoothness parameter greater than 0, $r_{i,j} = |p_i - p_j|$ is a distance between the points i and j, and $U(r) = r \log(r)$,
    forming a 3×3 matrix of zeros O;
    forming a (N+3)×(N+3) matrix $$L = \begin{bmatrix} K_\lambda & P \\ {}^t P & O \end{bmatrix};$$

calculating $L^{-1}Q$ wherein $$Q = {}^t \begin{pmatrix} \zeta_1^x(t), \ldots, \zeta_N^x(t), 000 \\ \zeta_1^y(t), \ldots, \zeta_N^y(t), 000 \end{pmatrix},$$

wherein $^t(\alpha | a \; b) = L^{-1}$ is an (N+3)×2 matrix and wherein | represents concatenation.

18. The computer readable program storage device of claim 9, wherein calculating g comprises initializing g to an identity mapping, and evaluating $$g(x) \leftarrow a(t)g(x) + b(t) + \sum_{i=1}^{N} \alpha_i(t) f_{\zeta_i(t)}(g(x))$$

for all $t = 0, \ldots, T$.

19. The computer readable program storage device of claim 9, wherein updating said curbs for t=T comprises calculating $$\zeta(T) \leftarrow g(\zeta(T)) - \gamma \frac{\partial C_F}{\partial g(\zeta(T))}(g(\zeta(T))),$$

wherein $$C_F(P^I) = \sum_{x,y} (S^F(x,y) - S^M(x,y))^2$$

said constraint energy, $S^F$ and $S^M$ are structural intensities for a fixed image and a moving image, respectively, wherein $$S^I = \sum_{i \in P^I} v_i^I K * \delta(P_i^I),$$

where $\delta$ represents the Dirac distribution, K represents a Gaussian kernel, points $P^I = \{P_1^I, \ldots, P_i^I, \ldots, P_n^I\}$ are points defining the edges of image I, wherein I is either the moving or the fixed image, $v^I = \{v_1^I, \ldots, v_i^I, \ldots, v_n^I\}$ are their associated values, $g(\zeta(T))$ represent the moving points, and $\gamma$ is a predefined constant.

* * * * *